United States Patent Office 3,197,421
Patented July 27, 1965

3,197,421
POLYMERIC ORGANOBORON COMPOUNDS AND METHOD OF PREPARING SAME
James L. Boone and Robert J. Brotherton, Fullerton, Calif., assignors to United States Borax & Chemical Corporation, Los Angeles, Calif., a corporation of Nevada
No Drawing. Filed June 13, 1962, Ser. No. 202,082
3 Claims. (Cl. 260—2)

The present invention relates as indicated to a new class of thermally stable polymeric organoboron compounds, and has further reference to a method for producing these polymeric compounds.

It is, therefore, the principal object of this invention to provide a new class of thermally stable polymeric organoboron compounds.

It is a further object of the present invention to provide means for preparing these thermally stable polymeric organoboron compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method for producing polymeric organoboron compounds which comprises heating under reflux an organobenzodiazaboroline of the formula

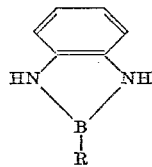

with phenyldichloroborane in the presence of a heat transfer medium inert to the reactants, continuously removing the hydrogen chloride reaction by-product, removing said heat transfer medium by distillation or filtration, and recovering and heating the resultant reaction mass in an inert atmosphere, where R is selected from the group consisting of methyl, phenyl, and meta and para methyl substituted phenyl.

The polymeric organoboron compounds of the present invention will find a wide variety of industrial applications. These compounds have utility as molding and casting resins and as binders for fiberglass laminates. They also have use as neutron absorbing materials, and as protective coatings.

The preparation of the present polymeric organoboron compounds can be illustrated by the following equation:

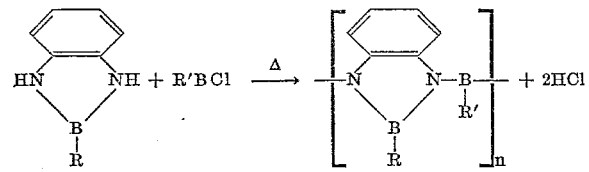

where R is methyl or phenyl or meta and para methyl substituted phenyl and R' is phenyl. Since we have not been able to completely identify the exact structure of the polymer formed by the present process, the foregoing equation only represents our theory of the product formed. While we do not wish to be held to the above theoretical structure, the fact nevertheless remains that the reaction between the phenyldichloroborane and the organobenzodiazaboroline does result in the polymeric organoboron compounds as disclosed and described herein.

There are several ways in which the present polymerization reaction can be carried out. The first of these methods is to mix the organobenzodiazaboroline and the organodichloroborane in a heat transfer medium which is inert to the reactants. The reaction mixture is then heated under reflux and the hydrogen chloride generated in the reaction is continuously removed from the reaction vessel in a stream of a dry inert gas such as nitrogen or helium. When the hydrogen chloride evolution is substantially complete, the heat transfer medium may be removed by distillation or filtration and any volatile reaction products are removed by distillation. The resultant reaction mass is then heated in an inert atmosphere to obtain the desired polymeric organoboron compounds.

Another method for performing the polymerization reaction is to mix the organobenzodiazaboroline and the organodichloroborane with 2,6-lutidine with or without an inert heat transfer medium. It will be noted that the 2,6-lutidine can be used in excess of the amount necessary to form the amine hydrochloride and the excess can thus act as the inert heat transfer medium. The reaction mixture is then heated under reflux and the hydrogen chloride complexes with the amine to produce an amine hydrochloride which forms a second phase with the reaction solution. After the reaction has been completed, the amine hydrochloride complex is readily separated from the reaction mass. The residual reaction solution is then subject to distillation to remove the heat transfer medium and any volatile reaction products, and the resultant reaction mass is then heated in an inert atmosphere to obtain the desired polymeric organoboron compound.

The materials applicable as heat transfer media in the present invention are the common aromatic hydrocarbon solvents and the chloro-substituted aromatic hydrocarbon solvents. The following list is illustrative of these solvents:

Benzene
Toluene
Xylene
Chlorobenzene
o-Dichlorobenzene
m-Dichlorobenzene

As regards the reactants applicable to the present invention, the first of these is the organobenzodiazaborolines having the formula

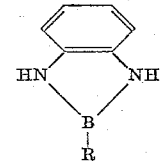

where R is either methyl, phenyl, or meta or para-substituted phenyl having methyl substituents. These compounds are known in the art, and can be prepared by the reaction of o-phenylenediamine with either a corresponding organodichloroborane or with a corresponding organoboronic acid.

The other reactant applicable to the present invention is, as noted above, phenyldichloroborane which is also well known to those skilled in the art of chemistry.

So that the present invention can be more clearly understood, the following examples are given for illustrative purposes:

I 2-phenyl-1,3,2-benzodiazaboroline, 7.32 grams (0.0377 mole), and 5.99 grams (0.0377 mole) of phenyldichloroborane were added to 15 ml. of o-dichlorobenzene in a round-bottomed flask under a slow stream of dry nitrogen gas. The reaction mixture was heated under reflux for about 165 hours at which time hydrogen chloride evolution had substantially ceased, and 0.0716 mole, 94.9% of theory, of hydrogen chloride had been swept from the reaction vessel. The resultant reaction mass was then subjected to distillation at reduced pressure to remove the o-dichlorobenzene, and a benzene soluble, polymeric compound, M.P. ~200° C., was recovered. Chemical analysis yielded the following data:

Calculated for $C_{18}H_{14}B_2N_2$: B=7.73%; Cl=0.00%. Found in product: B=7.86%; Cl=0.00%.

This was then heated under vacuum to 250° C. and then in a slow stream of dry nitrogen to 500° C. Some benzene was evolved in the process. The product, which was soluble in pyridine, was analyzed and found to contain 61.38% C, 4.92% H, 11.84% B, 17.96% N, and 0.00% Cl. Thermogravimetric analysis (heating rate, 150° C./hr., $10^{-4}$ mm.) gave the following weight losses: 4%/500° C., 10%/700° C., 13%/900° C.

II 2-methyl-1,3,2-benzodiazaboroline, 10.05 grams (0.0762 mole) and 12.11 grams (0.0762 mole) of phenyldichloroborane were added to 25 ml. of monochlorobenzene in a round-bottomed flask under a slow stream of dry nitrogen gas. The reaction mixture was heated under reflux for about 98 hours at which time hydrogen chloride evolution became extremely slow, and 0.111 mole, 72.7% of theory, of hydrogen chloride had been swept from the reaction vessel. The resultant reaction mass was filtered to remove a small amount of reaction by-products, and the filtrate was diluted with 450 ml. of pentane to precipitate the desired polymeric compound. The product was recovered by filtration and heated slowly to 450° C. in a slow stream of dry nitrogen. The product, which was moderately soluble in benzene, was analyzed and found to contain 64.06% C, 4.17% H, 11.70% B, 17.69% N, and 0.00% Cl. Thermogravimetric analysis (heating rate, 150° C./hr., $10^{-4}$ mm.) gave the following weight losses: 15%/500° C., 23%/700° C.

III 2-phenyl-1,3,2-benzodiazaboroline, 29.3 grams (0.1513 mole), was added to 75 ml. of anhydrous 2,6-lutidine in a dry nitrogen atmosphere and cooled to 0° C. Dichloro(phenyl)borane, 20.00 ml., 24.04 grams (0.1513 mole), was added dropwise. The mixture was refluxed (145–150° C.) for 26 hours, cooled, and the excess lutidine removed by vacuum distillation. The polymer was extracted from the 2,6-lutidine hydrochloride with benzene and then analyzed.

Calculated for $C_{18}H_{14}B_2N_2$: B=7.73%; N=10.01%; Cl=0.00%. Found in product: B=8.01%; N=10.20%; Cl=0.00%.

It was then heated in a nitrogen stream for 2 hours at 450° C. Benzene was evolved in the process. The product was soluble in pyridine and gave the following analyses:

Calculated for $C_{12}H_8B_2N_2$: B=10.72%; N=13.88%. Found in product: B=9.94%; N=13.34%. Thermogravimetric analysis (150° C./hr., $10^{4-}$ mm.) gave the following weight losses: 2.0%/500° C., 13.0%/700° C.

Other modes of applying the principle of the invention may be employed, change being made as regards the details described, provided the features stated in any of the following claims or the equivalent of such be employed.

We, therefore, particularly point out and distinctly claim as our invention:

1. The method for producing solid, thermally stable polymeric organoboron compounds which comprises heating under reflux an organobenzodiazaboroline having the formula

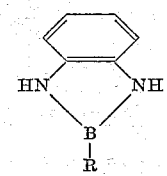

with phenyldichloroborane in the presence of a heat transfer medium inert to the reactants, continuously removing the hydrogen chloride reaction by-product, removing the inert heat transfer medium by distillation and recovering and heating the resultant reaction mass to at least about 450° C. in an inert atmosphere, where R is selected from the group consisting of methyl, phenyl, and meta and para methyl substituted phenyl.

2. The polymeric composition produced by the process of claim 1.

3. The method for producing solid, thermally stable polymeric organoboron compounds which comprises heating under reflux an organobenzodiazaboroline having the formula

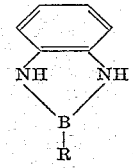

with phenyldichloroborane and excess 2,6-lutidine, removing the amine hydrochloride reaction by-product, removing the inert heat transfer medium and recovering and heating the resultant reaction mass to at least about 450° C. in an inert atmosphere, where R is selected from the group consisting of methyl, phenyl, and meta and para methyl substituted phenyl.

References Cited by the Examiner

Marvel et al.: WADD Technical Report 61–12, April 1961, pp. 103–104.

WILLIAM H. SHORT, *Primary Examiner*.

JOSEPH R. LIBERMAN, *Examiner*.